E. F. PAWSAT.
TANDEM SEAT FOR BICYCLES OR MOTOR CYCLES.
APPLICATION FILED JULY 6, 1915.
1,164,207.
Patented Dec. 14, 1915.
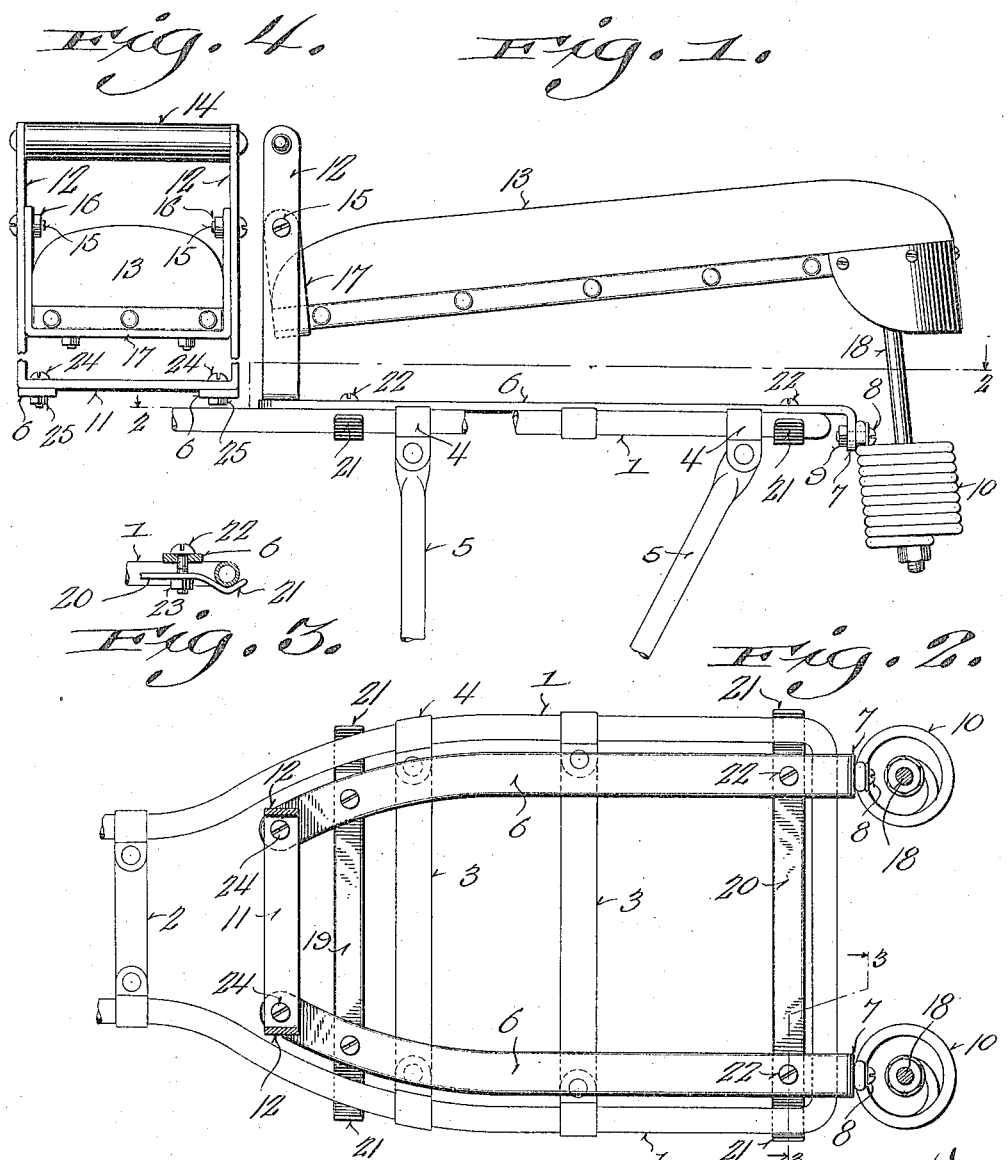

UNITED STATES PATENT OFFICE.

EWALD F. PAWSAT, OF SHEBOYGAN, WISCONSIN, ASSIGNOR TO WALD MANUFACTURING COMPANY, OF SHEBOYGAN, WISCONSIN.

TANDEM SEAT FOR BICYCLES OR MOTOR-CYCLES.

1,164,207.      Specification of Letters Patent.      Patented Dec. 14, 1915.

Application filed July 6, 1915. Serial No. 38,210.

*To all whom it may concern:*

Be it known that I, EWALD F. PAWSAT, a citizen of the United States, and resident of Sheboygan, in the county of Sheboygan and State of Wisconsin, have invented certain new and useful Improvements in Tandem Seats for Bicycles or Motor-Cycles; and I do hereby declare that the following is a full, clear, and exact description thereof.

This invention relates to the subject of seats, and more particularly to tandem seats for bicycles, motor-cycles, and the like.

The object of the invention is to provide a tandem seat that may be quickly attached to, or detached from the cycle, the seat being a strong and serviceable one possessing sufficient flexibility to thoroughly cushion the occupant against shocks and jars, and is formed of few parts, relatively arranged and connected, so that while flexibility is obtained there is no rattling or other disagreeable noise made by the said parts.

With the above and other objects in view, the invention contemplates the production of a base frame having novel means that permit the same to be readily attached to, or removed from a supporting frame, a seat having resilient connections with the rear of the base, and simple means for pivotally suspending the front of the seat, said suspending means including a hand grip or handle for the occupant of the seat.

One simple and thoroughly practical embodiment of the invention is shown in the accompanying drawings, wherein—

Figure 1 is a view in side elevation of the improved seat. Fig. 2 is a horizontal sectional view taken on the line 2—2, Fig. 1. Fig. 3, is a sectional view taken on the line 3—3, Fig. 2. Fig. 4 is a view in front elevation.

Referring to the accompanying drawings, 1 designates a supporting frame herein shown as of the usual type formed of a single length of material, shaped to produce the spaced parallel side bars connected by the rear end bar, the side bars converging at their forward ends, and being spanned by the transverse end and intermediate straps 2 and 3 respectively, the frame being adapted for use as a luggage carrier as well as a support for the seat and parts associated therewith. The frame, as is usual, has clip connections 4 with the braces 5 that connect with the cycle frame.

The base frame for the seat consists of the parallel side bars 6 preferably conforming to the contour of the side bars of the supporting frame, and a down-turned rear end 7 equipped with bolts 8 and nuts 9 for fastening the upper ends of the cushioning springs 10 thereto. At their forward ends, the bars 6 are connected by the base 11 of the U-shaped bar, the upstanding side legs 12 of which project above the seat 13 and are connected by the handle 14. At intermediate points the legs 12 carry pivot bolts 15 equipped with nuts 16 and upon which the legs of the U-shaped hanger 17 are mounted, so that said hanger is suspended for swinging movements within the U-shaped supporting bar. The seat 13 has its forward ends bolted or otherwise detachably fastened to the base of the hanger 17. The rear of the seat 13 carries depending rods 18, and said rods extend through the springs 10 and have their lower ends detachably fastened to the lower ends of said springs.

Adjacent their forward ends, the side bars 6 of the base frame are connected by the transverse bar 19 and a similar bar 20 connects the rear end portions of said bars 6. The bars 19 and 20 are duplicates, each having its ends projecting transversely beyond the side walls 6, and being shaped to form hooks 21 that extend beneath and interlock with the side bars of the supporting frame.

Preferably, the members of the base frame are formed of flat material so that they will lie snugly on top of the flat bars 3 of the supporting frame, and the bars 19 and 20 have their ends projecting beneath the bars 1, with their hook shaped portions interlocking with said bars 1. The fastening means employed for connecting the bars 6, and 19 and 20 are preferably nuts and bolts 22 and 23, and as the bars 6 lie on top of the bars 3, and the bars 19 and 20 extend beneath the bars 1, it will be clear that when the bolts 22 and nuts 23 are tightened, the base frame will be rigidly clamped to the supporting frame.

The U-shaped support 11 is also formed of flat material firmly fastened to the front end of bars 6 of the base frame by the bolts 24, and nuts 25, so that said support is an upstanding extension of the supporting frame, the connection between the upper ends of the said support 11 forming the handle by means of which the occupant is retained on the seat 13. Such upstanding support also serves as a hanger for the hanger 11, that suspends the forward end of the seat 13.

I claim:

1. In combination, a supporting frame formed of side bars and transverse bars, a base frame formed of side bars seated on the transverse bars, and transverse connecting bars, the end portions of which are extended past the base frame and project beneath and interlock with the side bars of the supporting frame, means for drawing the bars of the base frame together and securing them at their intersection, and a seat carried by the base frame.

2. In combination, a supporting frame formed of side bars and transverse bars, a base frame having side bars seated on the transverse bars and said base frame having transverse connecting bars, the end portions of which project beneath and terminate in end hooks for interlocking engagement with the side bars of the supporting frame, means for holding said end portions in clamping relation to said bars, and a seat carried by the base frame.

3. A tandem seat for cycles comprising a base frame, means for connecting the same to a support, an upstanding U-shaped support carried by the forward end of the base frame and terminating in a hand grip at its upper end, a U-shaped hanger pivotally mounted within the U-shaped support, a seat having its forward end fastened to the base of the hanger, and means for yieldably connecting the rear end of the seat to the base frame.

In testimony that I claim the foregoing I have hereunto set my hand at Milwaukee, in the county of Milwaukee and State of Wisconsin, in the presence of two witnesses.

EWALD F. PAWSAT.

Witnesses:
H. JOSEPH DOYLE,
M. E. DOWNEY.

Copies of this patent may be obtained for five cents each, by addressing the "Commissioner of Patents, Washington, D. C."